United States Patent
Martin et al.

(10) Patent No.: US 9,541,151 B2
(45) Date of Patent: Jan. 10, 2017

(54) DUAL STAGE SHOCK STRUT WITH REMOVABLE SECOND STAGE FLUID CHAMBER

(71) Applicant: Goodrich Corporation, Charlotte, NC (US)

(72) Inventors: Dennis W. Martin, Woodenville, WA (US); James P. Acks, Medina, OH (US)

(73) Assignee: Goodrich Corporation, Charlotte, NC (US)

( * ) Notice: Subject to any disclaimer, the term of this patent is extended or adjusted under 35 U.S.C. 154(b) by 12 days.

(21) Appl. No.: 14/620,006

(22) Filed: Feb. 11, 2015

(65) Prior Publication Data
US 2016/0230831 A1    Aug. 11, 2016

(51) Int. Cl.
| B64C 25/60 | (2006.01) |
| F16F 9/32 | (2006.01) |
| F16F 9/10 | (2006.01) |
| F16F 9/43 | (2006.01) |
| F16F 9/06 | (2006.01) |

(52) U.S. Cl.
CPC ............. *F16F 9/3271* (2013.01); *B64C 25/60* (2013.01); *F16F 9/063* (2013.01); *F16F 9/103* (2013.01); *F16F 9/437* (2013.01)

(58) Field of Classification Search
CPC .......... F16F 9/365; F16F 9/369; F16F 9/3207; B64C 25/22; B64C 25/60
USPC .... 188/322.19, 322.21, 314, 22.19, 322.213; 244/102 R, 102 SL, 102 SS
See application file for complete search history.

(56) References Cited

U.S. PATENT DOCUMENTS

| 2,155,605 A |   | 4/1939  | Lucien |   |
|---|---|---|---|---|
| 2,209,603 A | * | 7/1940  | Johnson | .................. B64C 25/60 188/322.19 |
| 2,563,518 A |   | 8/1951  | Dickerman |   |
| 3,011,777 A | * | 12/1961 | Stout | ...................... B64C 25/22 244/102 R |
| 4,291,850 A | * | 9/1981  | Sharples | ................ B60G 17/04 244/102 SS |
| 4,660,687 A |   | 4/1987  | Williams et al. |   |
| 5,148,896 A | * | 9/1992  | Ralph | ..................... B64C 25/60 188/314 |
| 6,676,076 B1 | * | 1/2004  | Davies | .................... B64C 25/60 188/314 |

(Continued)

OTHER PUBLICATIONS

Extended European Search Report dated Jun. 30, 2016 in European Application No. 16155010.8.

*Primary Examiner* — Christopher Schwartz
(74) *Attorney, Agent, or Firm* — Snell & Wilmer, L.L.P.

(57) ABSTRACT

In various embodiments, a two stage shock strut for use in a landing gear assembly may comprise a first cylinder, a fill port, a first stage piston head, a second cylinder, a second stage piston head, and a bleed tube. The first cylinder may define a first volume. The fill port valve may be in fluid communication with the first cylinder and configured to receive hydraulic fluid. The first stage piston head may be in fluid communication with the first volume. The second cylinder may comprise a metering pin. The metering pin may be in fluid communication with the first volume and a second volume defined by the second cylinder. The metering pin may be configured to receive the hydraulic fluid from the first volume and purge gas from the second volume. The second stage piston head may be in fluid communication with the second volume.

15 Claims, 7 Drawing Sheets

(56) References Cited

U.S. PATENT DOCUMENTS 8,565,965 B2* 10/2013 Nance ................. B64C 25/60
177/141
2016/0017953 A1* 1/2016 Lee ..................... B64C 25/60
188/297

* cited by examiner

DUAL STAGE SHOCK STRUT WITH REMOVABLE SECOND STAGE FLUID CHAMBER

FIELD

The present disclosure relates to landing gear, and more particularly, to systems and methods for increasing the serviceability of shock struts within landing gear.

BACKGROUND

Typically, an aircraft includes landing gear having wheels and shock struts. Many of these shock struts are now dual stage shock struts. These dual stage shock struts may include hydraulic fluid that benefits from servicing from time to time. To service typical dual stage shock struts, the aircraft is lifted above the ground so that the shock strut can be in the fully extended position for servicing. Alternatively, the shock strut may be cycled multiple times in attempt to fully remove any trapped gas internal to the shock strut during servicing. Both of these options are time consuming and costly.

SUMMARY

In various embodiments, a two stage shock strut for use in a landing gear assembly may comprise a first cylinder, a fill port, a first stage piston head, a second cylinder, a second stage piston head, and a bleed tube. The first cylinder may define a first volume. The fill port valve may be in fluid communication with the first cylinder and configured to receive hydraulic fluid. The first stage piston head may be in fluid communication with the first volume. The second cylinder may comprise a metering pin. The metering pin may be in fluid communication with the first volume and a second volume defined by the second cylinder. The metering pin may be configured to receive the hydraulic fluid from the first volume and purge gas from the second volume. The second stage piston head may be in fluid communication with the second volume. The hydraulic fluid supplied through the metering pin may be configured to translate the second stage piston head to a second fully compressed position. The bleed tube may be in fluid communication with at least one of the metering pin or the second volume. The hydraulic fluid supplied through the fill port valve may be exhausted through the bleed tube.

A second stage fluid chamber sub-assembly for use in a dual stage shock strut is provided. The second stage fluid chamber subassembly may comprise a cylinder, a piston head, a metering pin, and a bleed tube. The cylinder may define a volume. The piston head may be in fluid communication with the volume. The metering pin may be in fluid communication with the volume. The metering pin may be configured to conduct hydraulic fluid to the volume to exert a force on the piston head in response to a maintenance operation. The bleed tube may be in fluid communication with the volume. The bleed tube may be configured to purge gas from the volume in response to the maintenance operation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the centerline of an aircraft. As used herein, "proximal" refers to a direction radially inward, or generally, towards the centerline of an aircraft.

Figure 1:
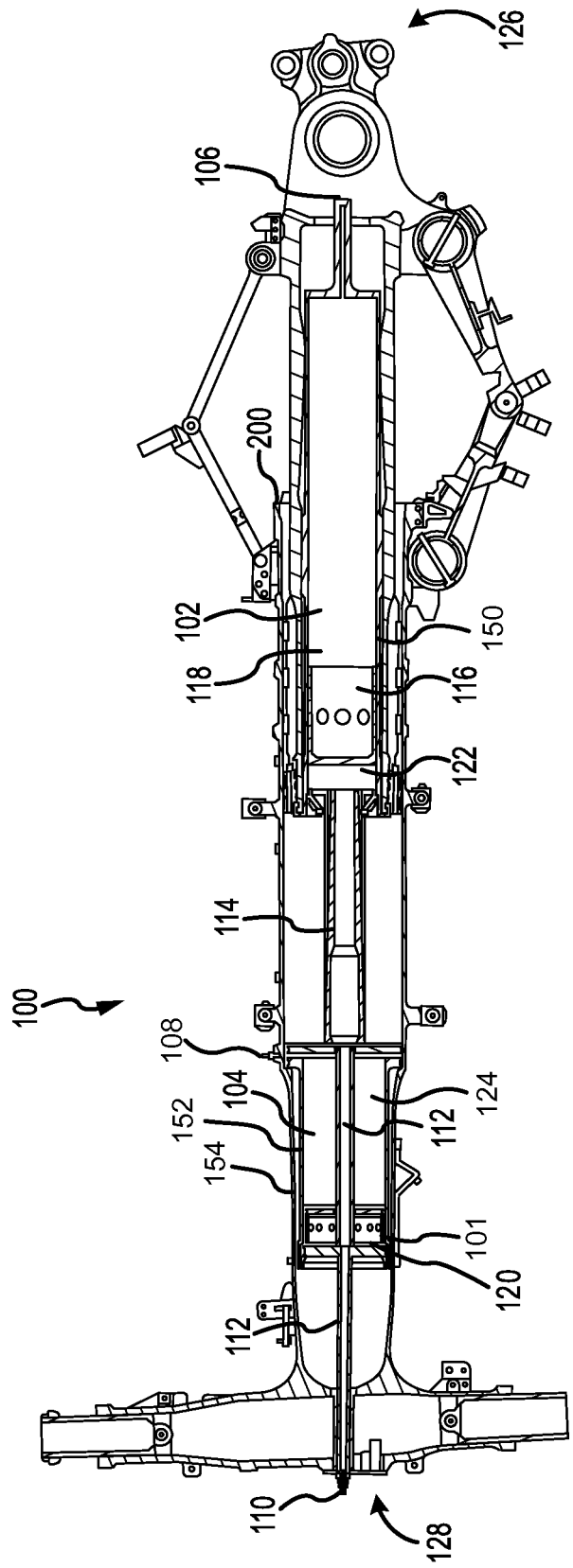
FIG. 1 illustrates a two stage shock strut for use in landing gear of an aircraft, in accordance with various embodiments.

FIG. 1 illustrates a two stage shock strut 100 for use in landing gear of an aircraft. In various embodiments, two stage shock strut 100 may include a proximal end 128 and a distal end 126. Proximal end 128 may be attached to the aircraft. Distal end 126 may be attached to one or more wheels. Two stage shock strut 100 may include a first stage and a second stage. The first stage may be defined by a first cylinder 150 that defines a first volume 102. The first stage may also include a first stage piston head 116. First stage piston head 116 may be operatively coupled to first cylinder 150. First stage piston head 116 may transition the first volume 102 into the first fluid chamber 118 by activating the third fluid chamber 122. First fluid chamber 118 may be filled with a gas, such as air or nitrogen.

In various embodiments, third fluid chamber 122 may be disposed proximate to first stage piston head 116. Third fluid chamber 122 may be configured to hold and/or may be filled, at least partially, with a hydraulic fluid. First stage piston head 116 may be a floating piston head such that it can move relative to first fluid chamber 118 and third fluid chamber 122.

In FIG. 1, two stage shock strut 100 is illustrated in an extended position. In this regard, two stage shock strut 100 may be in a deployed and unloaded condition. Stated another way, two stage shock strut 100 in a fully extended position includes the maximum distance between proximal end 128 and distal end 126.

In various embodiments and in operation, when sufficient force is applied to at least one of proximal end 128 or distal end 126 of two stage shock strut 100, first stage piston head 116 may translate relative to first fluid chamber 118 in the direction of distal end 126. As first stage piston head 116 translates in the direction of distal end 126, gas in first fluid chamber 118 and/or hydraulic fluid in third fluid chamber 122 may resist the translation and thus resist the applied force.

In various embodiments, the second stage of two stage shock strut 100 may include a second cylinder 152 that defines a second volume 104. Second cylinder 152 may be centered on the axis of first cylinder 150 and/or the centerline of two stage shock strut 100. Second cylinder 152 may comprise a metering pin 114. Metering pin 114 may be integrally formed on a surface of second cylinder 152 (e.g., a distal surface of second cylinder 152). Second cylinder 152 may be housed inside a third cylinder 154. Third cylinder 154 may also be centered on the axis of first cylinder 150 and/or two stage shock strut 100. Second cylinder 152 may be configured to be removable from third cylinder 154. For example, second cylinder 152 and its related parts may be assembled outside of third cylinder 154. Second cylinder 152 may be installed after assembly during manufacture of two stage shock strut 100. Second cylinder 152 may also be removed or replaced during overhaul or repair.

In various embodiments, the second stage may comprise a second stage piston head 101. Second stage piston head 101 may separate second volume 104 into a second fluid chamber 120 and a fourth fluid chamber 124. Second fluid chamber 120 may be configured to be at least partially filled with a hydraulic fluid. Second fluid chamber 120 may be in fluid communication with third fluid chamber 122. Fourth fluid chamber 124 may disposed distal to second stage piston head 101. Fourth fluid chamber 124 may include a fluid such as, for example, nitrogen, air, and/or the like. Second stage piston head 101 may be a floating piston such that it can move relative to second fluid chamber 120 and fourth fluid chamber 124.

In various embodiments and in operations, when sufficient force is applied to at least one of proximal end 128 or distal end 126, second stage piston head 101 may translate relative to second fluid chamber 120 in the direction of proximal end 128. As Second stage piston head 101 translates in the direction of proximal end 128, fluid in second fluid chamber 120 and gas in fourth fluid chamber 124 may resist the translation and thus resist the applied force.

In various embodiments, third fluid chamber 122 may be in fluid communication with second fluid chamber 120 via metering pin 114. Metering pin 114 may be a tube or other hollow device capable of transferring fluid. Metering pin 114 may limit the flow of hydraulic fluid between third fluid chamber 122 and second fluid chamber 120 during a dynamic event such as a landing or a takeoff of the aircraft. Stated another way, the metering pin 114 may prevent a hydraulic fluid flow rate from rising above a predetermined flow rate (where flow rate is defined as volume per second).

In various embodiments, second fluid chamber 120 may be in fluid communication with a bleed tube 112. Bleed tube 112 may be a tube or other hollow device capable of transferring fluid. Bleed tube 112 may be positioned within second fluid chamber 120 and fourth fluid chamber 124. Bleed tube 112 may be adapted to allow hydraulic fluid to be displaced from second fluid chamber 120 to a hydraulic bleed port 110. Hydraulic bleed port 110 may be sealable. For example, when sealed, hydraulic bleed port 110 may not allow hydraulic fluid to exit hydraulic bleed port 110. When unsealed, hydraulic bleed port 110 may allow hydraulic fluid traveling through bleed tube 112 from second fluid chamber 120 to evacuate via hydraulic bleed port 110. In this regard and during a maintenance operation, the hydraulic bleed port may be opened to bleed hydraulic fluid and/or a mixture of gas (e.g., air and nitrogen) and hydraulic fluid. This bleeding operation may allow the any gas (e.g., air and/or nitrogen) trapped in fluid chamber 120 to be purged and/or exhaust from fluid chamber 120.

In various embodiments, two stage shock strut 100 may include a fill port valve. Fill port valve 200 may be, for example, a changeover valve, and/or other suitable type of fill port valve. Fill port valve 200 may be in fluid communication with third fluid chamber 122. Fill port valve 200 may be adapted to allow fluid to be pumped into third fluid chamber 122. Fill port valve 200 may be sealable. For example, when sealed, hydraulic fluid may not be able to enter or exit third fluid chamber 122 via fill port valve 200. However, when unsealed, hydraulic fluid may be displaced via fill port valve 200 such that hydraulic fluid may be pumped into third fluid chamber 122 via fill port valve 200.

In various embodiments, first fluid chamber 118 may be in fluid communication with a first air charge port 106 and/or first fluid chamber 118. First air charge port 106 may be sealable. In this regard, fluid may not be displaced through first air charge port 106 when sealed. When unsealed, fluid may be displaced through first air charge port 106. First air charge port 106 may allow a fluid, such as, for example nitrogen gas or air, to be pumped into first fluid chamber 118. Fourth fluid chamber 124 may include a second air charge port 108. Second air charge port 108 may act in a similar fashion to first air charge port 106. Second air charge port 108 may be sealable and allow a fluid such as, for example, nitrogen or air, to be pumped into fourth fluid chamber 124.

In various embodiments, to service a typical two stage shock strut of an aircraft, the aircraft is typically lifted up so that the two stage shock strut is in a fully extended position. This is to ensure that the hydraulic fluid chamber or chambers contain the proper amount of hydraulic fluid. However, it is a costly and time consuming process to lift up the aircraft in order to service the hydraulic fluid. Two stage shock strut 100, however, includes various features which allow hydraulic fluid of two stage shock strut 100 to be serviced while two stage shock strut 100 is in a compressed position (i.e., without lifting up the aircraft).

Figure 2:
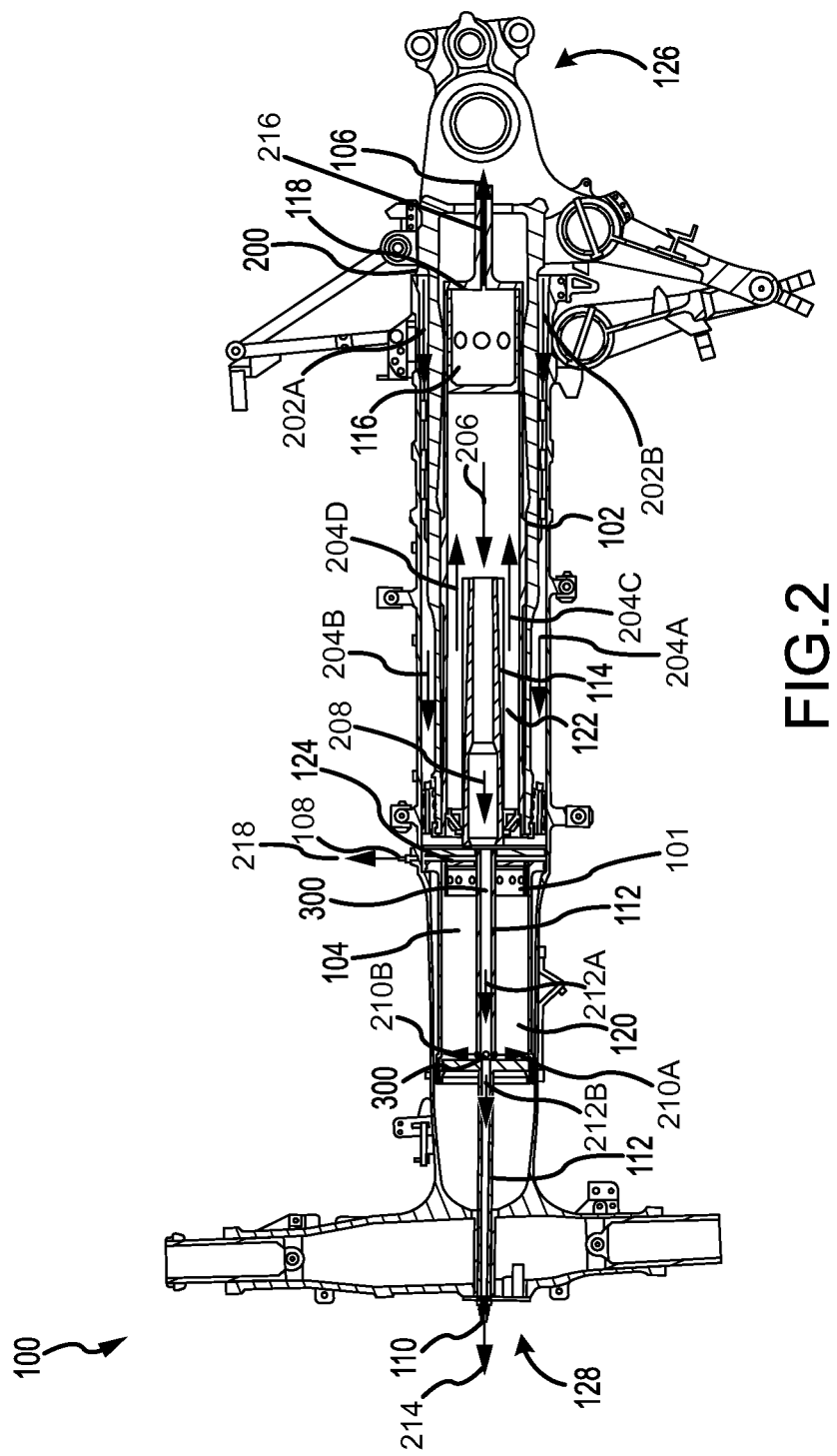
FIG. 2 illustrates a shock strut in a compressed position, in accordance with various embodiments.

FIG. 2 illustrates two stage shock strut 100 in a compressed position. In various embodiments, first stage piston head 116 is positioned adjacent to and proximal to distal end 126 of two stage shock strut 100. In response to two stage shock strut 100 being compressed as shown in FIG. 2, the volume (e.g., first volume 102 as shown in FIG. 1) of first fluid chamber 118 is reduced to its fully compressed trapped air volume. Second stage piston head 101 is distal to proximal end 128 of two stage shock strut 100 and allowed to bottom on the face of metering pin 114 and/or second cylinder 152. In response to two stage shock strut 100 being compressed, the volume of third fluid chamber 122 and the volume second fluid chamber 120 may be maximized. In this condition, the volume of first fluid chamber 118 and the volume of fourth fluid chamber 124 may be minimized. This compressed position may be achieved when two stage shock strut 100 is deployed and the aircraft is resting on the landing gear.

In various embodiments, and unlike traditional two stage shock struts, hydraulic fluid within two stage shock strut 100 can be serviced while in a compressed position. In order to service the hydraulic fluid, the fluid in first fluid chamber 118 may be released through first air charge port 106, as illustrated by arrow 216. Similarly, the fluid in fourth fluid chamber 124 may be released through and second air charge port 108, as illustrated by arrow 218. When two stage shock strut 100 is loaded (e.g., when the aircraft is resting on the landing gear) and fluid is released from first fluid chamber 118 and fourth fluid chamber 124, two stage shock strut 100 will become fully compressed (e.g., in the configuration shown in FIG. 2).

In various embodiments and in response to fluid being released from first fluid chamber 118 and fourth fluid chamber 124, the weight of the aircraft may compress the first stage and the fourth stage. In response to the first stage and the fourth stage being compressed, hydraulic fluid may be pumped into second fluid chamber 120 and third fluid chamber 122 via fill port valve 200. When the second fluid chamber 120 and third fluid chamber 122 are full of hydraulic fluid, the hydraulic fluid within second fluid chamber 120 and third fluid chamber 122 may become pressurized. When this hydraulic fluid is pressurized, first stage piston head 116 and second stage piston head 101 may be forced in the fully compressed positions. When fully compressed, first stage piston head 116 is at a position where it is mechanically prevented (as opposed to being prevented due to the force applied via hydraulic fluid and/or gas) from being displaced any farther towards proximal end 128. When fully compressed, second stage piston head 101 is at a position where it is mechanically prevented (as opposed to being prevented due to the force applied via hydraulic fluid and/or gas) from being displaced any farther from distal end 126. Hydraulic bleed port 110 may then be opened, releasing the hydraulic fluid.

Figure 5:
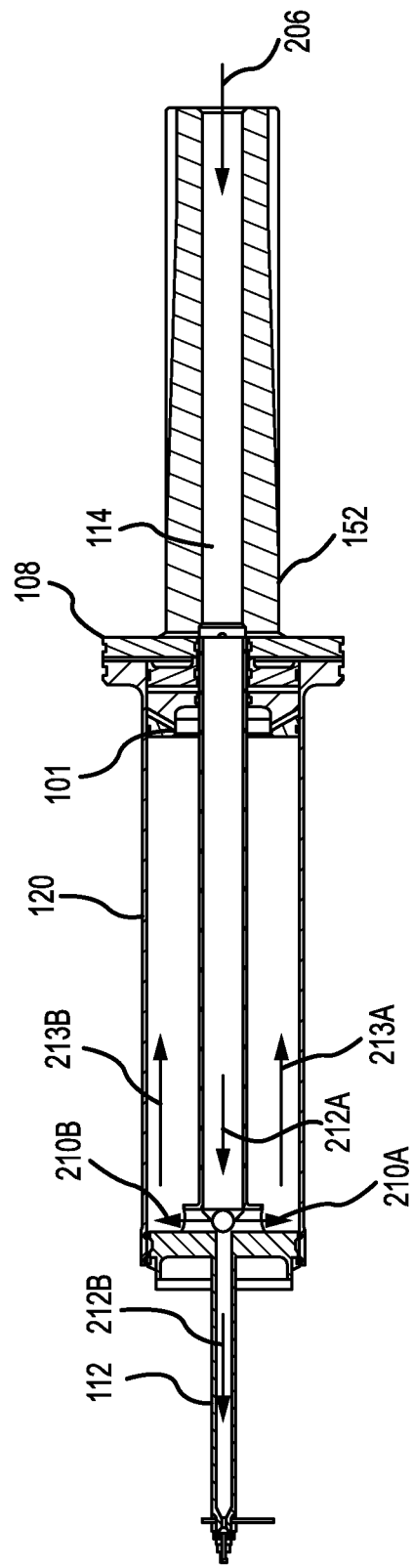
FIG. 5 illustrates a cross sectional view of a second portion of a subassembly in first configuration (e.g., a fully compressed configuration) of a two stage a shock strut, in accordance with various embodiments.
Figure 6:
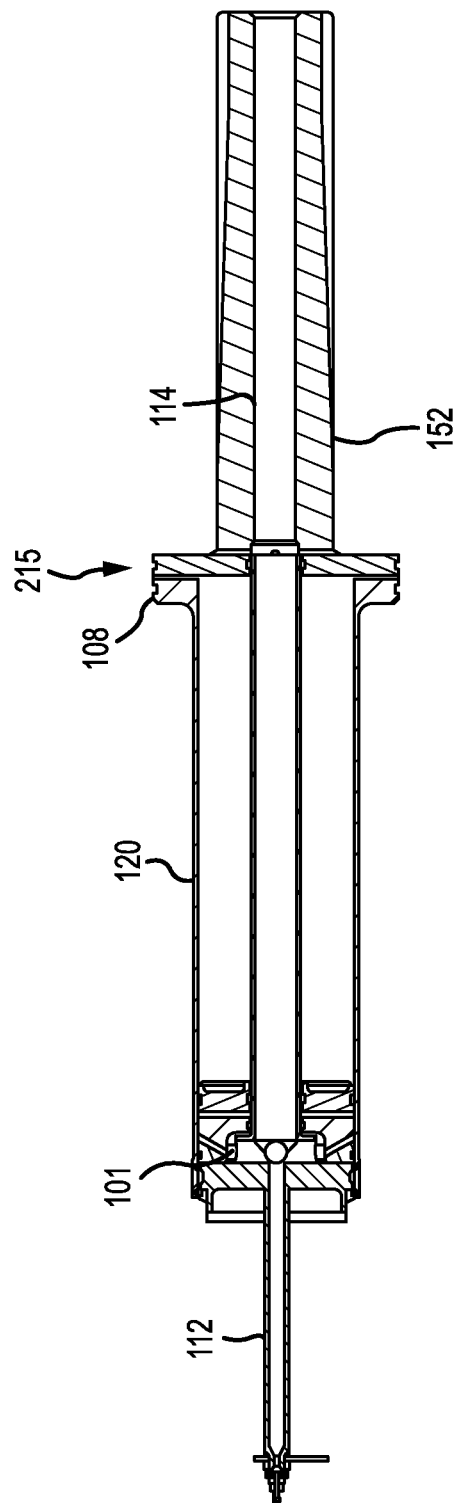
FIG. 6 illustrates a cross sectional view of a second portion of a subassembly in second configuration (e.g., a fully extended configuration) of a two stage a shock strut, in accordance with various embodiments.

In various embodiments and with reference to FIG. 2, FIG. 5, and FIG. 6, arrows 202A, 202B, 204A, 204B, 204C, 204D, 206, 208, 210A, 210B, 212A, 212B, 213A, 213B, and 214 illustrate the flow of hydraulic fluid within two stage shock strut 100. Arrow 202A and arrow 202B illustrate hydraulic fluid being pumped into fill port valve 200. The hydraulic fluid may then enter third fluid chamber 122, as illustrated by arrow 204A, arrow 204B, arrow 204C, and/or arrow 204D. The hydraulic fluid may become displaced into metering pin 114, as illustrated by arrow 206. The hydraulic fluid may be conducted into bleed tube 112, as illustrated by arrow 208. The hydraulic fluid may be is released into second fluid chamber 120 via holes 300 of bleed tube 112, as illustrated by arrow 210A and/or 210B. The pressurized hydraulic fluid within third fluid chamber 122, may exert a force on first stage piston head 116 forcing first stage piston head 116 into a fully compressed position. In this regard, first stage piston head 116 may not be mechanically displaced towards proximal end 128, as first air charge port 106 is unsealed, allowing gas within first fluid chamber 118 to freely exit first fluid chamber 118. Similarly, hydraulic fluid within second fluid chamber 120 may force second stage piston head 101 into a fully compressed position, as shown in FIG. 5. In this regard, second stage piston head 101 cannot be mechanically displaced any farther from distal end 126, as second air charge port 108 is unsealed, allowing fluid to freely exit fourth fluid chamber 124.

In various embodiments and in response to two stage shock strut 100 being fully compressed, hydraulic bleed port 110 may be unsealed. When hydraulic bleed port 110 is unsealed, hydraulic fluid may travel through bleed tube 112, as indicated by arrows 212A and 212B, where it then flows out hydraulic bleed port 110, as indicated by arrow 214. Initially, some non-hydraulic fluid, such as compressed or uncompressed nitrogen or air, may exit through hydraulic bleed port 110. This non-hydraulic fluid may have leaked into second fluid chamber 120 and/or third fluid chamber 122 from first fluid chamber 118 and/or fourth fluid chamber 124. Eventually, the hydraulic fluid causes second stage piston head 101 to extend downwards such that second fluid chamber 120 is fully extended. When this non-hydraulic fluid stops flowing through hydraulic bleed port 110 and only hydraulic fluid is flowing from hydraulic bleed port 110, it is known that second fluid chamber 120 and third fluid chamber 122 are fully extended and full of hydraulic fluid.

In various embodiments and in response to two stage shock strut 100 containing a proper amount of hydraulic fluid, hydraulic bleed port 110 may be sealed so that no additional hydraulic fluid can be displaced from second fluid chamber 120 or third fluid chamber 122. At this point, gas, such as compressed or uncompressed nitrogen or air, may be displaced into first fluid chamber 118 via first air charge port 106. Gases may be pumped into first fluid chamber 118 until first fluid chamber 118 is pressurized to a desired fluid pressure. When first fluid chamber 118 is properly pressurized, fluid may stop being pumped into first fluid chamber 118 and first air charge port 106 may be closed.

Similarly, fluid 215 (e.g., a gas such as for example, air and/or nitrogen) may be pumped into fourth fluid chamber 124 via second air charge port 108. Fluid 215 may be pumped into fourth fluid chamber 124 until fourth fluid chamber 124 is pressurized to the desired pressure and a predetermined stroke is achieved. When this happens, fluid 215 may stop being pumped into fourth fluid chamber 124 and second air charge port 108 may be closed. Fluid 215 may cause second stage piston head 101 to translate from a fully compressed configured, as shown in FIG. 5, to a fully extended position as shown in FIG. 6. In this regard, second stage piston head 101 translate toward proximal end 128 of two stage shock strut 100. At this point, two stage shock strut 100 is properly serviced as it contains a desired amount of hydraulic fluid and first fluid chamber 118 and fourth fluid chamber 124 are pressurized to a desired amount. All these steps may be performed while the aircraft is resting on its landing gear.

In various embodiments, fluid may be pumped into fourth fluid chamber 124 before first fluid chamber 118 based on the air curve requirements of two stage shock strut 100. For example, if fourth fluid chamber 124 is designed to bottom out before first fluid chamber 118, it may be preferable to fill fourth fluid chamber 124 prior to filling first fluid chamber 118.

In the manner described above, two stage shock strut 100 may have its hydraulic fluid serviced without requiring the aircraft to be lifted above the ground. This is a simpler and less expensive method for servicing the aircraft than jacking up the aircraft in order to fully extend two stage shock strut 100.

Figure 3:
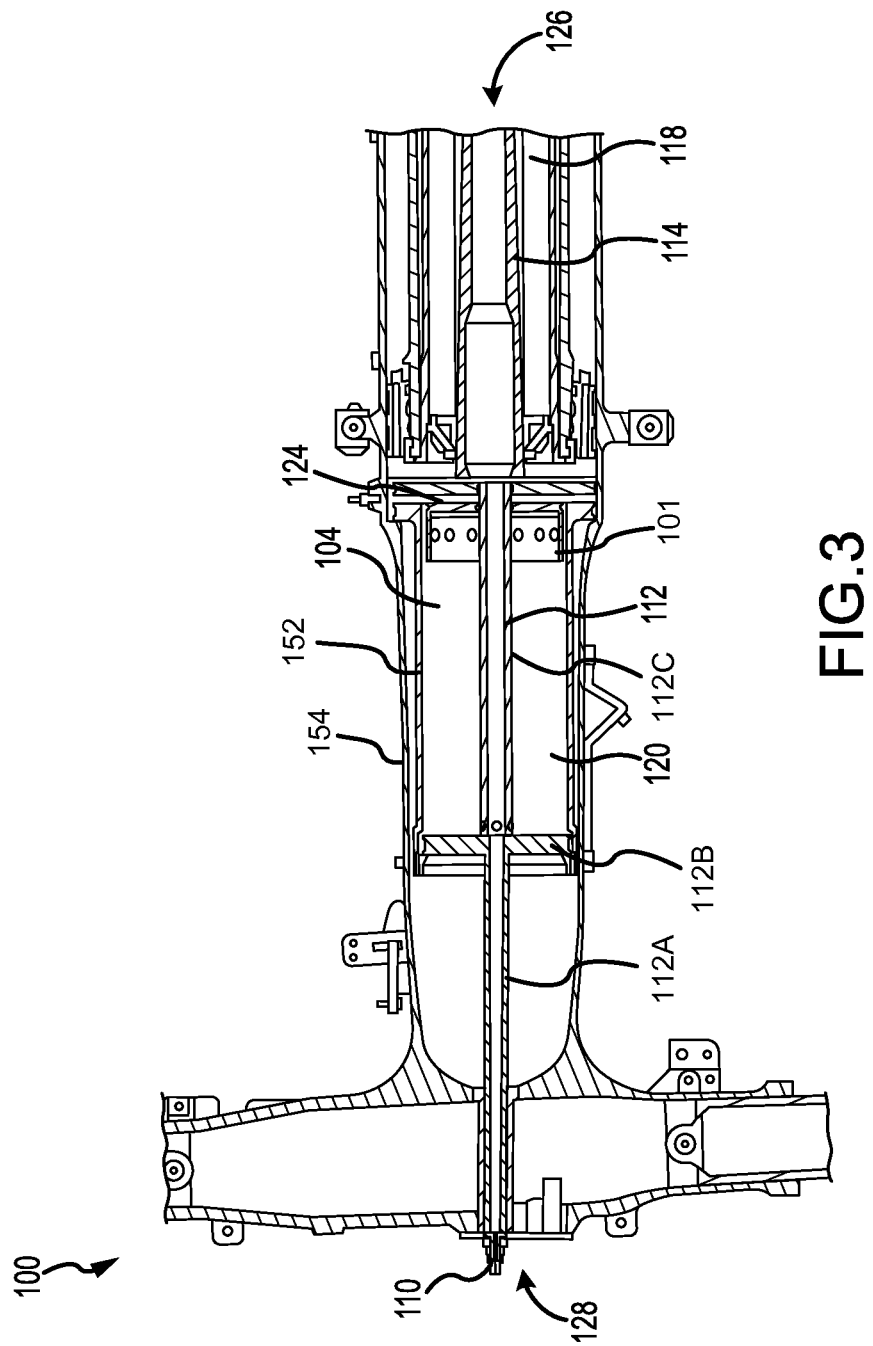
FIG. 3 illustrates an enlarged view of a second stage of a shock strut, in accordance with various embodiments.

FIG. 3 illustrates an enlarged view of the second stage of two stage shock strut 100. FIG. 3 provides a closer view of second stage piston head 101 in the fully compressed position. In various embodiments, second stage piston head 101 may be located within second cylinder 152 and positioned between second fluid chamber 120 and fourth fluid chamber 124. Second stage piston head 101 may surround bleed tube 112 so that second stage piston head 101 may separate second fluid chamber 120 from fourth fluid chamber 124 while allowing bleed tube 112 to be in fluid communication with second fluid chamber 120.

FIG. 3 provides a closer view of second cylinder 152. In various embodiments, second cylinder 152 and its related components may also be referred to as a second stage fluid chamber sub-assembly. As a result of configuring the second cylinder 152 as its own sub-assembly, second cylinder 152 and the components contained therein may be manufactured separate from the second stage of two stage shock strut 100 which may result in less seals required for the second stage of two stage shock strut 100. This allows for fewer failure points within the second stage sub-assembly as a whole. Configuring the second cylinder 152 as a separate sub-assembly allows for easier manufacture and greater flexibility during maintenance. For example, second cylinder 152 and its related components may be removed from two stage shock strut 100 during maintenance for repair, reconditioning, and/or replacement.

In various embodiments, bleed tube 112 may be housed at least partially within second cylinder 152. Bleed tube 112 may be a portion of metering pin 114. First section 112C of bleed tube 112 is a tube that extends from metering pin 114 in the direction of the proximal end of two stage shock strut 100. Bleed tube 112 may be centered on the axis of two stage shock strut 100. First section 112C of bleed tube 112 is in fluid communication with metering pin 114 and second fluid chamber 120. The bulkhead section 112B of bleed tube 112 abuts with the inner portion of the proximal end of second cylinder 152 and is in fluid communication with first section 112C of bleed tube 112 and second section 112A of bleed tube 112. The first section 112C, second section 112A, and bulkhead section 112B of bleed tube 112 may be one part or more than one part configured to attach to one another.

Figure 4:
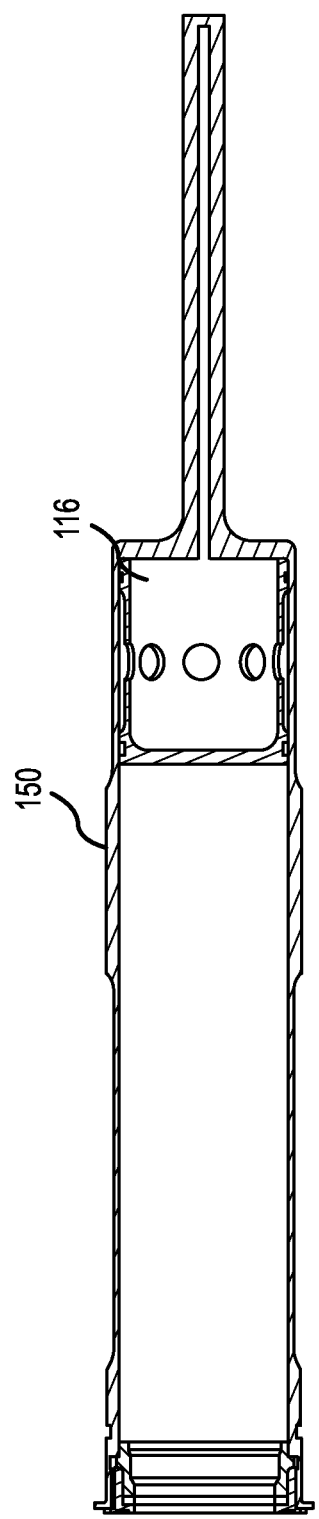
FIG. 4 illustrates a cross sectional view of a first portion of a subassembly of a two stage a shock strut, in accordance with various embodiments.

In various embodiments and with reference to FIGS. 4 through 6, first stage piston head 116 may be installed within first cylinder 150. First stage piston head 116 may be retained in first cylinder 150 in any suitable fashion. This assembly may define a first stage chamber. The first stage chamber is shown in a fully compressed configuration in FIG. 4. Second stage piston head 101 may be installed on bleed tube 112. Bleed tube 112 may be installed within second cylinder 152 and coupled to metering pin 114. Bleed tube 112 may be retained and/or trapped by one of more retainers. The retainers may be configured to secure and/or operatively couple bleed tube 112 to second cylinder 152 and/or metering pin 114.

In various embodiments, second cylinder 152 may comprise a cylinder length, a cylinder shape, a cylinder diameter, and a cylinder volume. These different properties may affect the tendency of two stage shock strut 100 to behave in different ways. For example, a longer cylinder length may allow for a longer second stage stroke. Also, a smaller cylinder diameter might allow for a faster displacement rate of the proximal end relative to the distal end of the shock strut given a hydraulic fluid flow rate leaving the cylinder. For a given third cylinder, various sized second cylinders may be configured to be housed inside of said third cylinder which may simplify manufacturing and allow tailoring for different applications.

Figure 7:
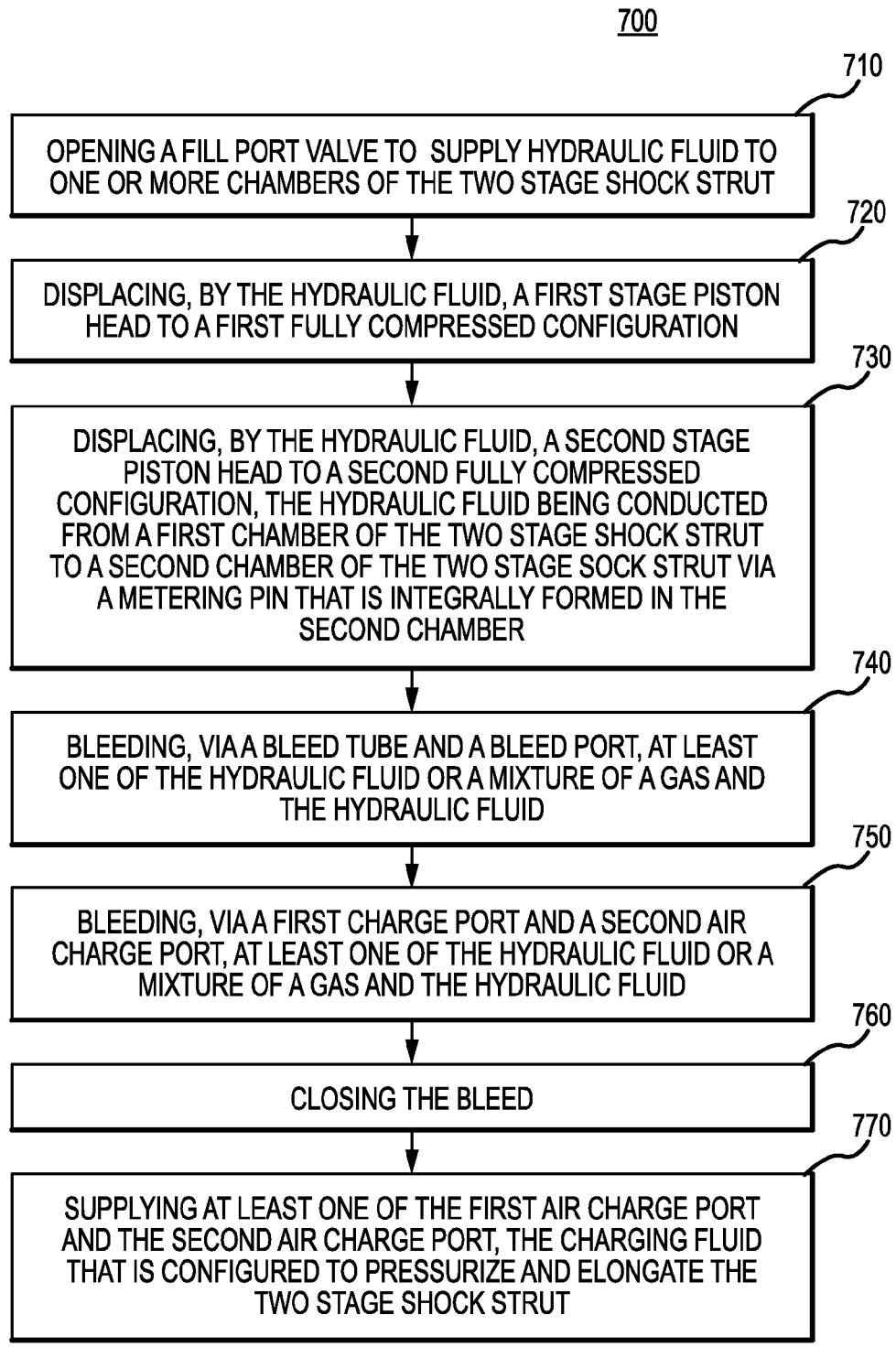
FIG. 7 illustrates a method for maintain a two stage a shock strut, in accordance with various embodiments.

In various embodiments and with reference to FIG. 7, a method 700 of maintaining a two stage shock strut is provided. The method may comprise opening a fill port valve to supply hydraulic fluid to one or more chambers of the two stage shock strut (Step 710). Method 700 may further comprise displacing, by the hydraulic fluid, a first stage piston head to a first fully compressed configuration (Step 720). Method 700 may further comprise displacing, by the hydraulic fluid, a second stage piston head to a second fully compressed configuration, the hydraulic fluid being conducted from a first chamber of the two stage shock strut to a second chamber of the two stage shock strut via a metering pin that is integrally formed in the second chamber (Step 730). Method 700 may further comprise bleeding, via a bleed tube and a bleed port, at least one of the hydraulic fluid or a mixture of a gas and the hydraulic fluid (Step 740). Method 700 may further comprise bleeding, via a first air charge port and a second air charge port, at least one of the hydraulic fluid or a mixture of a gas and the hydraulic fluid (Step 750). Method 700 may further comprise closing the bleed port (Step 760). Method 700 may further comprise supplying at least one of the first air charge port and the second air charge port, the a charging fluid that is configured to pressurize and elongate the two stage shock strut (Step 770).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A two stage shock strut for use in a landing gear assembly, comprising:
    a first cylinder defining a first volume;
    a fill port valve in fluid communication with the first cylinder and configured to receive hydraulic fluid;
    a first stage piston head in fluid communication with the first volume;
    a second cylinder comprising a metering pin, the metering pin in fluid communication with the first volume and a second volume defined by the second cylinder,
       wherein the metering pin is configured to receive the hydraulic fluid from the first volume and purge gas from the second volume;
    a second stage piston head in fluid communication with the second volume,
       wherein the hydraulic fluid supplied through the metering pin is configured to translate the second stage piston head to a second fully compressed position; and
    a bleed tube in fluid communication with at least one of the metering pin and the second volume,
    wherein the hydraulic fluid supplied through the fill port valve is exhausted through the bleed tube.

2. The two stage shock strut of claim 1, wherein the metering pin is integrally formed in the second cylinder.

3. The two stage shock strut of claim 2, further comprising an air charge port in fluid communication with the first fluid chamber, wherein gas may be pumped into the first fluid chamber via the air charge port.

4. The two stage shock strut of claim 2, further comprising an air charge port in fluid communication with a fourth fluid chamber, wherein the gas may be pumped into the fourth fluid chamber via the air charge port.

5. The two stage shock strut of claim 1, wherein the bleed tube is operatively coupled to a hydraulic bleed port.

6. The two stage shock strut of claim 5, wherein the hydraulic bleed port is opened for bleeding at least one of the hydraulic fluid or a mixture of gas and the hydraulic fluid during a maintenance operation.

7. The two stage shock strut of claim 6, wherein in response to the bleeding the second stage piston head is translated to the second fully compressed position.

8. The two stage shock strut of claim 1, wherein the bleed tube defines a hole positioned within a second fluid chamber such that at least one of the hydraulic fluid or a mixture of gas and the hydraulic fluid is displaced between the second fluid chamber and the bleed tube via the hole.

9. The two stage shock strut of claim 1, wherein the hydraulic fluid supplied through the fill port valve is configured to exert a force on the first stage piston head in response to a maintenance operation, and wherein the first stage piston head is configured to translate to a first fully compressed position in response to the force.

10. The two stage shock strut of claim 1, wherein the two stage shock strut is configured to achieve a fully compressed configuration in response to a maintenance operation.

11. A second stage fluid chamber sub-assembly for use in a dual stage shock strut, comprising:
    a cylinder defining a volume;
    a piston head in fluid communication with the volume, the piston head separating the volume into a first chamber and a second chamber;
    a metering pin in fluid communication with the volume and configured to conduct hydraulic fluid to the volume to exert a force on the piston head in response to a maintenance operation;
    a bleed tube in fluid communication with the volume and configured to purge gas from the volume in response to the maintenance operation, the bleed tube extending into the first chamber and into the second chamber.

12. The second stage fluid chamber sub-assembly of claim 11, wherein the bleed tube is operatively coupled to a hydraulic bleed port that is opened to purge the gas in response to the maintenance operation.

13. The second stage fluid chamber sub-assembly of claim 11, wherein the piston head is translated to a fully compressed configuration in response to the hydraulic fluid being pressurized during the maintenance operation.

14. The second stage fluid chamber sub-assembly of claim 11, wherein the cylinder comprises an air charge port configured to receive the gas in response to the maintenance operation.

15. The second stage fluid chamber sub-assembly of claim 14, wherein the piston head is configured to translate to an extended configuration in response to receiving the gas in response to the maintenance operation.

* * * * *